Patented June 7, 1927.

1,631,265

UNITED STATES PATENT OFFICE

JOHN J. HARRIS, OF CHICAGO, ILLINOIS.

ADHESIVE.

No Drawing.   Application filed August 29, 1924. Serial No. 734,879.

This invention relates to adhesives, and is particularly adapted to be used as a substitute for glues and the like, and as an adhesive for wood, stone, glass, metals, canvas, and the like.

This is an improvement on my former Patent No. 1,498,270, granted June 17, 1924, which is for somewhat the same combination of elements, but to which is added a solution of rubber.

A colloidal clay, commonly known as bentonite, forms the base of this adhesive, and this is pulverized and mixed with water, the material showing its colloidal character by absorbing water and often swelling to several times its original volume. It is readily suspended in water and remains in suspension practically indefinitely. In this form it has adhesive properties.

To this is added silicate of soda, which may be likewise dissolved in water and then added to the bentonite already in suspension before the rubber solution is added thereto, or the silicate of soda and bentonite may be mixed and reduced to a paste simultaneously by adding water and heating. The inclusion of sodium silicate greatly improves the adhesive qualities of the product, and can be used to advantage in quite large proportions where its staining action is not objectionable.

A solution of rubber in carbon tetra-chloride or benzol, rubber latex, and other dispersions of rubber in liquid vehicles when mixed with the bentonite paste, alone or in combination with sodium silicate, coacts with it to produce an adhesive having very different adhesive qualities, particularly when applied to metals, as aluminum. If desired, the mixture may be heated to about 160° F., which will facilitate the smooth and uniform inclusion of the rubber solution.

While the proportions of the various elements may be greatly varied, I have found that the following proportions by weight interact to produce a very effective adhesive:

| | Per cent. |
|---|---|
| Bentonite (dry) | 20 |
| Sodium silicate (65% solution) | 58 |
| Rubber solution | .7 |
| Water | 13 |

The rubber solution may vary however from 2% to 25% of the whole with good results.

The above is also improved, particularly for use as an adhesive for metals, such as aluminum, and for glass or wood, by the addition of 2% to 10% of whiting or slaked lime.

While the above is a preferred proportion of the various elements, I have found that these may be differently proportioned between quite wide limits and still preserve the adhesive properties previously descrbed.

I claim:

1. An adhesive, comprising a dispersion of bentonite, silicate of soda, water, and rubber dissolved in a rubber solvent.

2. An adhesive comprising a dispersion of bentonite, silicate of soda, water, rubber dissolved in a rubber solvent, and whiting.

3. An adhesive comprising bentonite, silicate of soda, water, and 2% to 25% of a solution of rubber in a rubber solvent.

JOHN J. HARRIS.